June 22, 1965  S. BITKO  3,190,952
WELDED HERMETIC SEAL
Filed Feb. 21, 1963
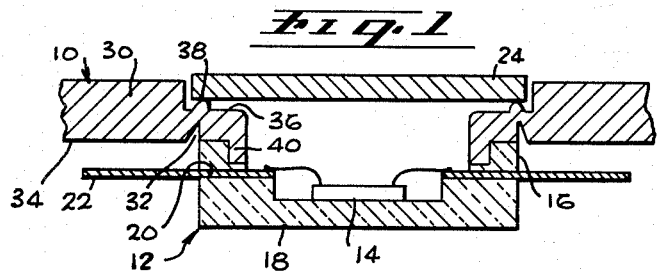
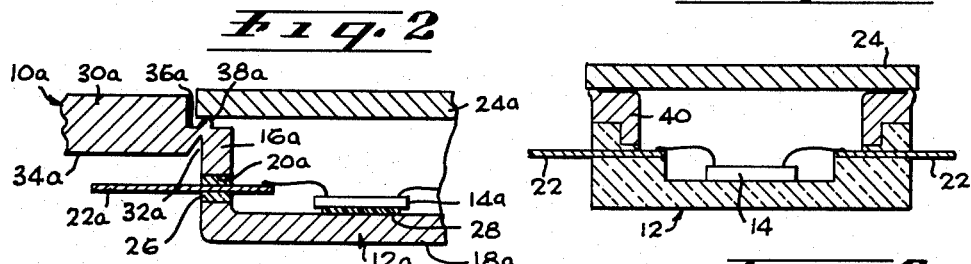
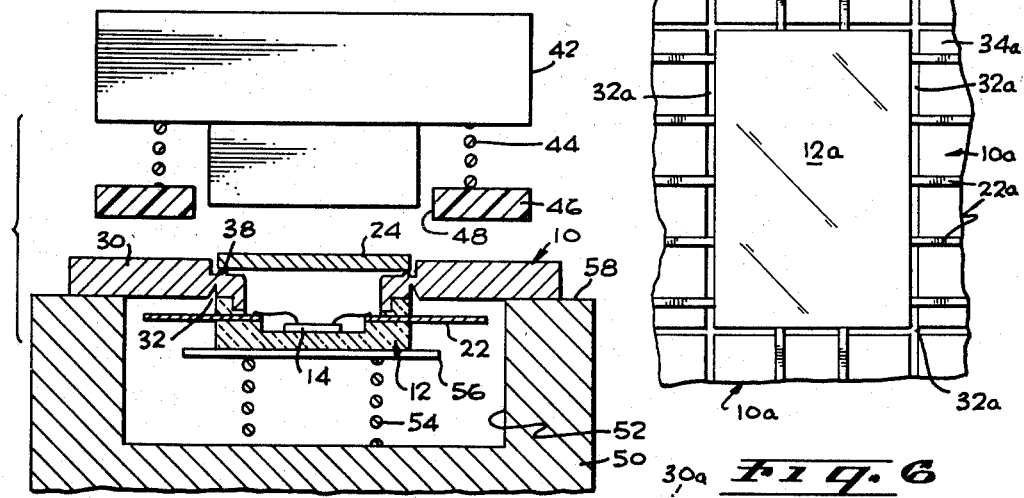
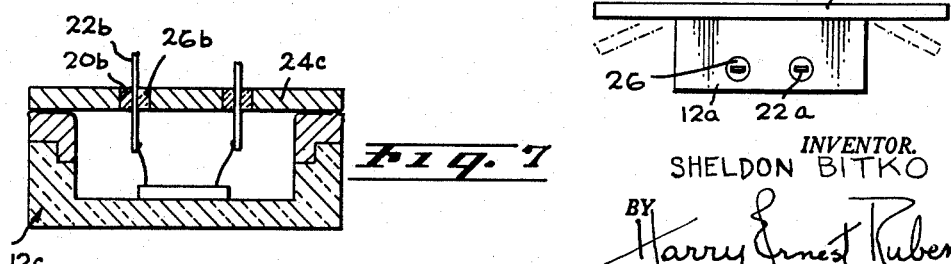
INVENTOR.
SHELDON BITKO
BY Harry Ernest Rubens
ATTORNEY

United States Patent Office 3,190,952
Patented June 22, 1965

3,190,952
WELDED HERMETIC SEAL
Sheldon Bitko, Stamford, Conn.
(66—36 Yellowstone Blvd., Forest Hills, N.Y.)
Filed Feb. 21, 1963, Ser. No. 260,254
5 Claims. (Cl. 174—52)

This invention relates to hermetic seals and, more particularly, to a method of hermetically sealing an electronic component in a container by resistance welding.

Pressure formed seals are adequate where flanges are provided on the component container and cover to permit the flanges to be clamped together without damage to the glass insulation supporting the wire leads. So, too, are solder seals, if flux is not employed when the electrical component is flux sensitive. Heat also may be utilized, if it is low enough to prevent damage to the component. The limitations thus imposed on these methods require the use of flanges, which increases the overall dimensional requirement, or involve the danger of heat and contamination.

The problem becomes aggravated when the connections from the component in the container are changed from the axial to the radially extending lead design. This involves a cup shaped container with the leads extending through the side walls. In this type of package, it is impossible to weld the cover or cap to the body or cup with the normal resistance weld technique, due to cracks appearing in the glass insulators forming the support for the leads, causing leaks.

At present the radial lead design is manufactured either by plastic encapsulation or by ultrasonic soldering methods. The ultrasonic soldering method produces far less reliable seals than does the resistance welding process. In addition, plastic encapsulation does not provide a hermetic seal. Consequently, neither of these methods meets with Government standards. Nevertheless, the desirability of the radial lead design exceeds the drawbacks, and the foregoing two types of radial lead package are being purchased by the Government for various projects.

The principal object of the present invention is to provide a practical method of sealing a radial lead container that will meet or exceed Government standards.

A further object is to provide a method of sealing a radial lead container that will not increase its size. A seal may also be obtained by applying a cover to the upper metal rim of the cup container and stitch welding the two together. This involves repositioning a .005" long electrode many times around the top cover and welding the cover in overlapping contacts. This type of operation is costly, time consuming, and unreliable.

Further objects consist in formulating a single shot technique of welding the cover to the radial lead container without damage to the glass insulators supporting the leads, or to the container itself; of providing a flange construction suitable for the welding technique but capable of being removed thereafter to provide a sealed welded construction with little change in size or cost; and to provide the foregoing in a construction adapted for mass production and with maximum reliability.

These and other objects are accomplished and new results obtained as will be apparent from the pen described in the following specification, particularly pointed out in the claims, and illustrated in the accompanying drawing in which:

FIG. 1 is a longitudinal cross-sectional view of the invention with an electrical component positioned in a glass container with radial extending leads and a flanged rim in position for welding to the cover;

FIG. 2 is a similar view with a metal container used in the construction;

FIG. 3 is a diagrammatic view of the device of FIG. 1, positioned in a welding fixture;

FIG. 4 is a view similar to FIG. 1 with the flange broken off, after the welding operation;

FIG. 5 is a bottom view of the construction of FIG. 2, showing the notched flanged rim;

FIG. 6 is a side elevation of the device in FIG. 5 with the breakaway movement of the flange indicated in dot-dash lines; and FIG. 7 is a longitudinal cross-sectional view of a modification employing axial leads.

As is apparent from the drawing, the objects of the invention are obtained by providing a breakaway welding flange formed about the mouth of the container housing the electrical component, which may be easily separated from the welded and sealed construction, so as to provide a container of minimum size.

More specifically, the metal flanged rim 10 is fused to the rim of a glass cup-like container 12 forming the body, inside of which is positioned the electrical component 14, which may be a transistor or other device.

The body 12 includes the side walls 16, and the bottom 18.

The side walls are apertured, as at 20, through which project radially, the component electrical leads 22, directly fused to the glass walls for proper seal and support.

A metal cover 24 is seated on the flanged rim 10, to which it is ultimately welded as will be hereinafter explained.

The body may be entirely made of metal, such as Kovar, as is shown in FIG. 2, wherein the flanged rim 10a is integrally formed with the body 12a. Apertures 20a are provided in the metal wall 16a, large enough to contain beads of glass 26, which act to insulate and support the radial leads 22a, connected to the electrical component 14a, insulated from the metal bottom 18a by a layer of suitable insulation material 28.

The flanged rims 10 and 10a of the respective devices shown in FIG. 1 and FIG. 2 are provided with flanges 30 and 30a respectively, which are made separable from the rims, by weakening the metal. i.e., by forming peripheral wedge shaped notches 32 and 32a on the undersides 34 and 34a of the flanges, immediately adjacent the rims. The notches are shown in greater detail in FIG. 5 where a rectangular body is illustrated.

On the upper surface of the flanged rims, seats 36 and 36a are formed for positioning the metal covers 24 and 24a. In making notches 32 and 32a, the upset metal may be driven into the seats forming wedge shaped weld projections 38 and 38a upon which the respective covers are seated.

The notches and weld projections assist to channel the welding current to the area to be welded; they and the flange itself also serve to direct the heat away from the glass which insulates and supports the radial leads, and away from the component. Thermal shock is thus minimized.

In the glass container of FIG. 1, the rim is desirably formed with a downwardly extending inner lip 40 to provide a re-entrant joint between glass and metal to increase the contact area and improve the seal.

The parts may be welded together, in some fixture such as shown in FIG. 3. Here the upper electrode 42 is biased upward and away from the cover 24 by the pressure spring 44, positioned between the electrode and the insulating pressure pad 46. An opening 48 is formed in the pressure pad to allow the upper electrode to pass therethrough to engage the cover 24 during the welding operation.

A lower electrode 50 is formed with a recess 52 to permit seating the flanged container and electrical component. Within the recess is positioned the spring 54, for urging the insulating pad 56, against the bottom 18 of the container. The breakaway flange 30 rests on the upper surface 58 of the lower electrode. The cover is then deposited in the seat 36, over projections 38 and the welding operation is completed. The electrode 42 descends, the insulating pressure pad grips the flange 30, allowing electrode 42 to contact the cover 24. The current flows through the cover, through the upset metal, forming the projections into the flange and to the lower electrode. The cover is thus welded to the encircling weld projection forming a secure seal between the rim and cover.

The metal cup illustrated in FIG. 2 may be similarly welded.

The completely welded construction is shown in FIG. 6. The flange 30 is thereafter cut or broken away by swinging the flange through the positions shown by the dot-dash lines separating the flange from the sealed container. The notches 32a assist the breakaway action. The final appearance with the flange removed, is shown in FIG. 4. The effective size of the sealed container is substantially that of the container body.

The metal where it is fused to the glass is joined according to well known techniques, such as Kovar and glasses having matched coefficients of expansion. The cover since it is not sealed to the glass, need not be of the same metal as the contacting metal. The metal should not be made of high electrical conducting metal, since the weld is of the resistance type to develop the necessary welding heat.

Thermal shock is thus reduced to acceptable limits.

Any shape of container and cover may be used as cost and manufacturing requirements dictate.

Instead of a container with radial extending leads, the axially extending lead type may be employed, such as is shown in FIG. 7. Here the cover 24c is shown provided with apertures 20b containing the glass insulators 26b, through which the leads 22b extend. The axial positioning of the leads may alternatively be directed through the bottom of the container 12c, if mounting requirements so dictate.

I have thus described my invention, but I desire it understood that it is not confined to the particular forms or uses shown and described, the same being merely illustrative, and that the invention may be carried out in other ways without departing from the spirit of my invention, and therefore I claim broadly the right to employ all equivalent instrumentalities coming within the scope of the appended claims, and by means of which objects of my invention are obtained and new results accomplished as it is obvious that the particular embodiments herein shown and described are only some of the many that can be employed to obtain these objects and accomplish these results.

I claim:

1. The method of welding a metal cover to a container having side walls and a bottom, and an opening at the top for the metal cover, and a metal rim having an outwardly extending integral flange which comprises electrically, welding the cover to the metal rim to form a sealed edge using the flange as an electrode for the welding current, and thereafter removing the flange from the metal rim.

2. The method of claim 1, wherein the metal flange is first provided with a weakened portion to facilitate removal of the flange from the rim.

3. The method of electrically welding two metal parts together, having substantially the same peripheral shape, which comprises forming one of the parts with an outwardly extending metal flange; electrically connecting one of the parts to the other through the flange; electrically welding the two parts together; and thereafter removing the metal flange from the metal part to which it is attached.

4. As an article of manufacture a container comprising a body member and a closure member; securing means attaching the closure member to said body member; one of said members having a metal peripheral portion provided with a metal flange extending from the periphery of the member having a weakened portion for ready removal of the entire flange from said member; said weakened portion being positioned beyond the bounds of the members and the securing means.

5. A sealed electrical component comprising a container member; an electrical component contained therein; a closure member; sealing means securing the closure member to the container member for sealing the electrical component therein; and a metal flange extending from one of the members, having a metal peripheral portion with a weakened portion for ready removal of the entire flange from said members; said weakened portion being positioned beyond the bounds of the members and the securing means.

References Cited by the Examiner

UNITED STATES PATENTS

| | | | |
|---|---|---|---|
| 1,128,842 | 2/15 | Bonnell | 220—27 X |
| 1,961,728 | 6/34 | Arnest et al. | |
| 2,184,939 | 12/39 | Green | 219—93 X |
| 2,210,225 | 8/40 | Walensky | 220—27 X |
| 2,218,858 | 10/40 | Rosenbloom. | |
| 2,473,660 | 6/49 | Parmann | 219—93 |
| 2,945,163 | 7/60 | Kilby et al. | 174—68.5 X |
| 2,957,236 | 10/60 | Kreuchen. | |

DARRELL L. CLAY, Acting Primary Examiner.

JOHN P. WILDMAN, JOHN F. BURNS, LARAMIE E. ASKIN, Examiners.